United States Patent [19]
Bennion et al.

[11] Patent Number: 5,141,828
[45] Date of Patent: Aug. 25, 1992

[54] ELECTROCHEMICAL SYSTEM USING BIPOLAR ELECTRODE

[75] Inventors: Douglas N. Bennion, Provo, Utah; Rodney M. Lafollette, Suffield, Conn.; Lance L. Stewart, Salt Lake City, Utah

[73] Assignee: Brigham Young University, Provo, Utah

[21] Appl. No.: 523,496

[22] Filed: May 14, 1990

[51] Int. Cl.$^5$ .......................................... H01M 10/18
[52] U.S. Cl. ................................. 429/210; 429/225; 429/252; 29/623.5; 205/63
[58] Field of Search ............... 429/225, 210, 252, 254, 429/217, 185, 209; 204/2.1, 39, 45.1; 141/1.1, 32; 419/1, 61, 65, 66, 30; 29/623.5

[56] References Cited

U.S. PATENT DOCUMENTS

| | | | |
|---|---|---|---|
| 3,676,222 | 7/1972 | Deibert | 429/42 |
| 3,859,138 | 1/1975 | Narsavage et al. | 429/42 |
| 4,259,389 | 3/1981 | Vine et al. | 429/252 X |
| 4,359,511 | 11/1982 | Strzempko | 429/252 |

Primary Examiner—Anthony Skapars
Attorney, Agent, or Firm—Terry M. Crellin

[57] ABSTRACT

Improvements are disclosed for electrochemical cells of the type comprising at least two bipolar electrodes, with a space occurring between adjacent electrodes which contains a liquid electrolyte. Improvement include forming improved plates for the electrodes from a thermoplastic polymer containing carbon black, wherein the electrodes are formed by dissolving the polymer in a suitable solvent, mixing carbon black with the solvent solution of the polymer, evaporating the solvent from the polymer solution containing the dispersed carbon black, pulverizing the resultant mixture of polymer and carbon black to form a powder, and pressing the powder at an elevated temperature into the improved plates. There is further disclosed, improvements in the formation of electrochemically active material on the plates of the bipolar electrodes, as well as improved separators for positioning between the bipolar electrodes and improved means for sealing the spaces between bipolar electrodes.

26 Claims, 1 Drawing Sheet

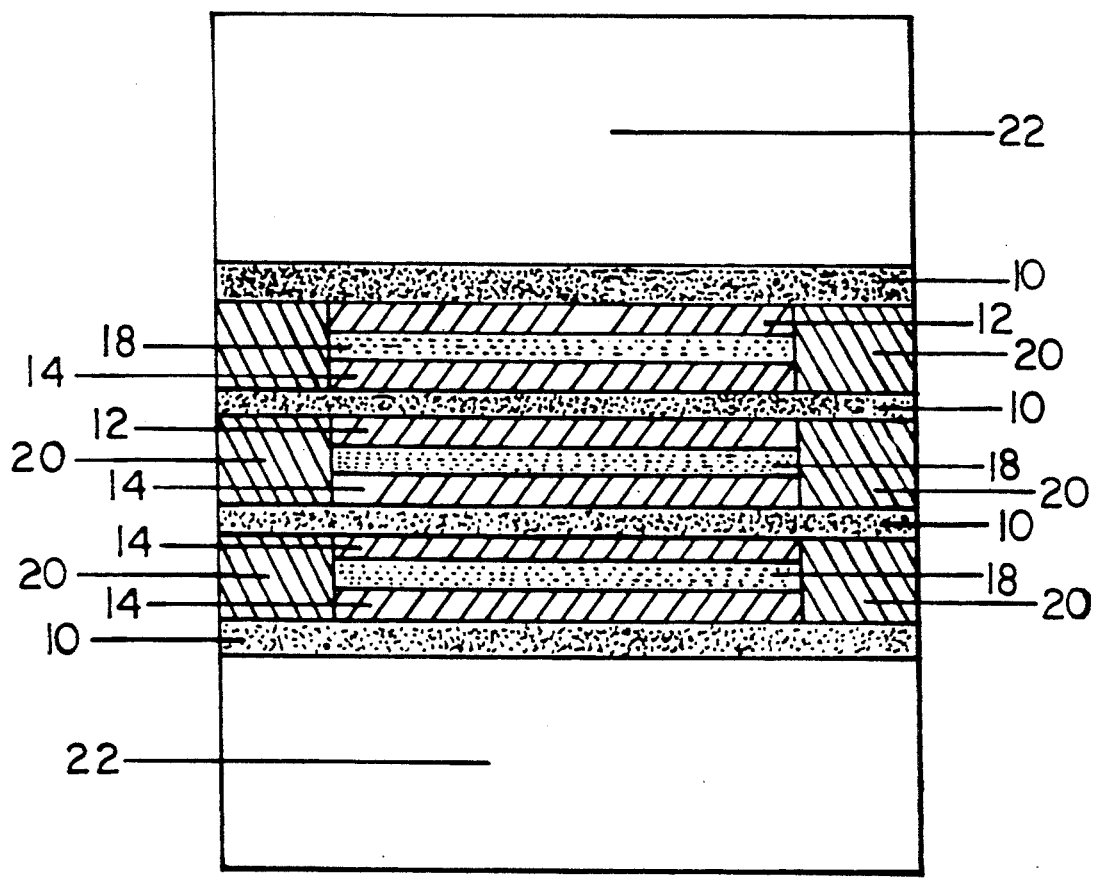

ELECTROCHEMICAL SYSTEM USING BIPOLAR ELECTRODE

BACKGROUND OF THE INVENTION

1. Field of the Invention

The present invention relates to electrochemical systems employing bipolar electrodes, and more particularly to improvements in various components of such a system, including such components as the electrodes, electrochemically active material contained on the electrodes, ionically conductive separators between electrodes, and seals used in containing the liquid electrolytes in the system, to produce a system capable of generating an exceptionally high output current density over short periods of time.

2. State of the Art

Electrochemical systems employing bipolar electrodes are well known, having been used by Faraday as early as 1839. Such a system comprises a stack or pile of electrodes comprising electronically conductive layers or plates with appropriate electrochemically active material applied to the opposite, broad surfaces or sides of the conductive layers or plates. Alternating with the electrodes in the stack or pile are ionically conductive layers or zones which contain an appropriate electrolyte. Means must be provided, of course, for retaining the electrolyte in the layers or zones between the electrodes, with the electrolyte making electrical contact with the respective electrodes.

It is known to form the conductive layer or plate of the electrode from electrically conductive plastic. See U.S. Pat. No. 4,098,967 wherein a conductive substrate is disclosed which is made of fluorocarbon polymer. The polymer is filled with finely divided vitreous carbon. Production of the filled polymer is accomplished by mixing the polymer in finely divided particles with the particles of carbon. The mixture is then set by compression molding at elevated temperature and pressure.

Absorbent separators for placement between electrodes are disclosed in U.S. Pat. No. 3,862,861. The absorbent separators disclosed in that patent are made from microporous rubber, polyvinyl chloride, polyolephins, phenolic resin impregnated paper and fiber glass material, with the latter being taught as the preferred material.

U.S. Pat. No. 3,862,861 further discloses pasting of various electrochemically active materials to the substrate of the electrodes. U.S. Pat. No. 4,098,967 teaches that improved bonding of the electrochemically active material is greatly improved by bonding a layer of lead alloy foil to the faces of the plastic substrate.

Various means have been proposed for sealing the electrolyte within its proper layer or zone in bipolar systems. Gasket members which are held by mechanical compression between the electrodes are disclosed in U.S. Pat. No. 4,637,970. In addition, use of a sealing means composed of a glue applied between the electrodes and a casing enclosing the electrodes was suggested. In U.S. Pat. No. 4,098,967 the plastic substrates forming the electrodes are molded with enlarged perimeters having mating, stepped edges which interfit to provide a seal between adjacent electrodes. In U.S. Pat. No. 4,208,473 an elaborate system of tortuous-pathed, e.g., finned, peripheral sections are provided on the electrodes to reduce parasitic current flow between adjacent cells due to electrolyte films which develop around intercell barriers.

3. Objectives

It is a principal objective of the invention to provide improvements in electrochemical systems or batteries of the type employing bipolar electrodes, whereby the system will yield an exceptionally high current capacity pulse in the 0.2 to 5 millisecond time range.

One improvement comprises a more efficient conductive substrate plate for the bipolar electrodes, wherein the improved plate has exceptionally low internal resistance that contributes to the high current capacity of the battery.

Another improvement comprises the formation of enhanced layers of pure electrochemically active material on the substrate plate to augment the action of the improved substrate plate in producing bipolar electrodes which have exceptionally high current generation capability.

A further improvement comprises a more efficient separator used to contain the electrolyte, wherein the improved separator enhances oxygen gas transmission from the positive electrode where the oxygen gas is generated to the negative electrode where the oxygen gas recombines with the electrochemically active material at that electrode.

A still further improvement comprises a novel sealing mechanism including spacer and sealing rings made of a thermoplastic material, with the rings surrounding the space or zone between electrodes which contain the electrolyte, with the sealing rings being heat fused and sealed to the peripheral portion of the thermoplastic plates to form a positive, liquid tight seal.

BRIEF DESCRIPTION OF THE INVENTION

The above objectives are achieved in accordance with the present invention by providing improvements in an electrochemical cell of the type comprising the following features:

(a) at least two electrically conductive plates which have opposite, broad sides, with the plates disposed side-by-side so that a broad side of one plate is spaced from and faces a respective broad side of an adjacent plate and (b) a layer of electrochemically active material on each of the broad sides of the plates which face a respective broad side of an adjacent plate, with a space occurring between the layers of active material on adjacent plates, with a liquid electrolyte contained in the space between the layers of active material on adjacent plates so as to establish an ionically electrically conductive path between the layers of active material on the adjacent plates.

A basic aspect of the improvements of the present invention comprises forming improved plates from a thermoplastic polymer containing carbon black. The polymer is dissolved in a suitable solvent, and the carbon black is intimately mixed with the solvent-polymer solution. After thoroughly mixing the carbon black with the solvent-polymer solution, the solvent is evaporated from the solvent-polymer solution containing the dispersed carbon black. This produces a hardened, solid polymer containing carbon black substantially uniformly dispersed therethrough. The hardened polymer is then pulverized to form a powder. Finally, the powder is compression molded at an elevated temperature into the improved plates. The exceptionally uniform dispersion of carbon black throughout the polymer forming the improved plates provides superior electrical properties, whereby the plates exhibit very low internal resistance. The exceptionally low internal resistance in part at least produces the high current capacity obtained with the battery system of the present invention.

In another aspect of the present invention, the electrochemically active material on each of the broad sides of the plates is applied in a manner that also contributes to the high current capacity of the present system. In one improvement for forming the electrochemically active material on the plates, a layer of lead powder is pasted on respective first sides of the plates, and a layer of lead dioxide is pasted on respective second sides of the plates. In another embodiment, layers of lead monoxide are pasted on both sides of the plates, and the layers on respective first sides of the plates are converted to lead, with the layers on respective second sides of the plates being converted to lead dioxide. In a variant of the latter embodiment, each of the broad sides of the plates have layers of lead sulfate pasted thereon, with the layers on respective first sides of the plates being converted to lead and the layers on respective second sides of the plates being converted to lead dioxide.

In a particularly preferred embodiment for forming the electrochemically active material on the broad sides of the plates, layers of lead are electroplated on both sides of the plates. The layers of lead on respective first sides of the plates are then converted to lead dioxide.

In another basic improvement in accordance with the present invention, a porous electrolyte absorbing and retaining separator is provided in the space or zone between the layers of active material on adjacent plates. The separator comprises a porous sheet of fibrous material, with porous polytetrafluoroethylene powder being dispersed substantially uniformly through the sheet of fibrous material. The liquid electrolyte of the system is retained in the sheet of fibrous material.

In a still further improvement in accordance with the invention, the layers of electrochemically active material are formed on the central portions of the broad sides of the plates so that a peripheral edge portion of the plates extend from and surrounds the periphery of the layers of active material. Continuous, circuitous spacer and sealing rings are positioned between adjacent plates, with the spacer and sealing rings surrounding both the space or zone between the respective layers of active material on the facing sides of adjacent plates and the respective layers of chemically active material. The spacer and sealing rings further contact the facing peripheral edges of the adjacent plates which extend beyond the respective layers of electrochemically active material. The spacer and sealing rings are formed from a thermoplastic polymer which is heat sealed to the thermoplastic polymer forming the facing peripheral edges of the adjacent plates to form a positive, liquid tight seal which contains the electrolyte in the proper space or zone in the battery system.

Additional objects and features of the invention will become apparent from the following detailed description, taken together with the accompanying drawing.

THE DRAWING

Preferred embodiments of the present invention representing the best mode presently contemplated of carrying out the invention are illustrated in the accompanying drawing in which the single figure is a cross section through a bipolar battery system incorporating the improvements of the present invention.

DETAILED DESCRIPTION OF THE PREFERRED EMBODIMENTS

As mentioned previously, bipolar electrochemical systems are well known in the art. Generally, such a system comprises a stack or file of alternating electronically conductive plates 10 as shown in drawing. The plates 10 have chemical reactants applied to the opposite surfaces to form traditional bipolar electrodes. The electrodes are stacked with a space formed between adjacent electrodes. The space between electrodes contains an electrolyte which may be retained in a porous separator member which otherwise occupies the space between the electrodes. The aforementioned system comprising bipolar electrodes alternating with electrolyte containing spaces does not per se form any novelty of the present invention. In accordance with the present invention several improvements are made in the bipolar electrochemical systems to provide exceptionally high pulse of energy or current capacity in the 0.2 to 5 millisecond time range. With battery systems utilizing the improvements of the present invention, current densities of up to 30 amps per square centimeter can be achieved at 0.8 volts.

The improvements of the present invention are particularly adapted to a lead acid battery system and will be described below with reference to a lead acid system. It should however be understood that the improvements disclosed herein are applicable to other electrochemical systems using liquid electrolytes. In a lead acid battery system such as shown in the drawing, the chemical reactants are present on the plates 10 in the form of a layer 12 of lead and a layer 14 of lead dioxide, with the layer 12 of lead on one side of each plate 10 and the layer 14 of lead dioxide on the other side. As the system discharges, lead sulfate is formed from the reactants on each side of the plates 10. During recharging, the lead sulfate is converted back to lead and lead dioxide on the respective sides of the plates 10. The end plates of the battery have a layer of chemical reactant (either lead or lead dioxide) on only one side, with that side being the one facing the other plates 10 in the system.

One of the basic improvements of the present invention comprises forming improved plates 10 from a thermoplastic polymer containing a much improved, uniform dispersion of carbon black. The improved plates 10 having an exceptionally low internal resistance contributing at least in part to the high current capacity of the present system. Because of the corrosive nature of the electrolyte used in electrochemical systems, the plates 10 must be made of a material which is able to withstand the action of the electrolyte. It has been found that polyethylene mixed with carbon black withstands the corrosive action of such electrolyte solutions very well.

The improved plates 10 of the present invention have the carbon black dispersed in the polymer to a degree not achieved in the prior art. The improved plates 10 are made by a novel method in which a thermoplastic polymer (polyethylene) is dissolved in a suitable solvent, such as toluene, xylene and benzene. As an example, polyethylene is mixed with toluene and the mixture is heated to a temperature of 100° C. for a time sufficient to dissolve the polyethylene in the toluene. Once the polymer is dissolved, carbon black is added to the solution, and the solution is mixed vigorously, such as in a blender.

Following the mixing of carbon black into the solution, the solvent (toluene) is evaporated to produce a hardened, solid mixture of polymer (polyethylene) having carbon black uniformly dispersed therein. The hardened, solid polymer containing the carbon black is then pulverized to a powder. The powder is compression molded at an elevated temperature to form the improved plates 10 of the present invention. The amount of carbon black in the filled polymer from which the plates 10 are formed is preferably between about 20% and 40% by weight. The plates 10 are formed so as to have a thickness of between about 0.004 inch and 0.01 inch.

After the plates 10 are formed, thin layers 12 and 14 of electrochemically active material are applied to the opposite sides of the plates 10 to form the bipolar electrodes. Broadly speaking, a layer 12 of a first electrochemically active material in the form of a reducing agent is pasted on respective first sides of the plates 10, and a layer 14 of a second electrochemically active material in the form of an oxidizing agent is pasted on respective second sides of the plates 10. The layers of electrochemically active mixture generally have a thickness of 0.005 inch to 0.002 inch, preferably about 0.001 inch.

In one embodiment of the invention, the layers 12 of first electrochemically active material comprises lead powder, and the layers 14 of second electrochemically active material comprises lead dioxide. In another embodiment, layers of lead monoxide or lead sulfate are pasted on both sides of the thin plates 10. The layers of lead monoxide or lead sulfate are then converted so as to form the layers 12 of lead on respective first sides of the plates 10 and layers 14 of lead dioxide on the respective second sides of the plate.

In a particularly preferred embodiment of the invention, layers of lead are electroplated to both sides of the plates 10, and thereafter the layer 14 on one side is oxidized to lead dioxide, with the other sides retaining their layer 12 of lead. The electroplating of the lead layers on the plates 10 has four steps. First, the plates 10 are etched for about two minutes in a solution of 80% $H_2SO_4$ saturated with $CrO_3$ maintained at a temperature of about 80° C. Second, the etched plates are then sensitized in a solution of about 50 grams per liter of $SnCl_2$ and about 50 grams per liter of HCl for approximately three minutes. Third, the sensitized plates are activated in a solution of about 0.8 gram per liter of $PdCl_2$ and 11 grams per liter of HCl for about two minutes. The fourth step is the actual electroplating which is done in a solution of about 60 grams per liter of $HBF_4$, about 26 grams per liter of $H_3BO_3$, about 80 grams per liter of $PbCO_3$ and about 1 gram per liter of peptone. The plates are submerged in the plating solution and a current of approximately 0.14 amps per square centimeter is passed through the plates and the plating solution for about three minutes.

Just prior to the oxidation of the layers 14 of electroplated lead on respective one sides of the plates 10, the plates containing the layers of electroplated lead are subjected to a cathodic treatment which is run at about three volts for about 30 seconds in a solution of about 1.3 moles per liter of $H_2SO_4$ and about 0.1 mole per liter of $KClO_4$. The oxidizing of the respective lead layers to lead dioxide is done in a similar solution for two minutes at about four volts.

A further improvement in accordance with the present invention comprises utilizing a porous electrolyte absorbing and retaining separator 18 in the space between the layers 12 and 14 of active material on adjacent plates 10. The separator 18 comprises a porous sheet of fibrous material, with porous polytetrafluoroethylene powder being dispersed substantially uniformly through the sheet of fibrous material, and with the liquid electrolyte being retained in the sheet of fibrous material. Preferably, the separator will contain from about 1% to 5% by weight porous polytetrafluoroethylene based on the dry fibrous material in the separator 18. The fibrous material is preferably selected from the group consisting of glass fibers and cellulose fibers.

Advantageously, the space between the layers 12 and 14 of active material on adjacent plates 10 and the thickness of the sheet 18 of fibrous material is between about 0.0008 and 0.0015 inch, with the sheet 18 of fibrous material being in contact with the layers 12 and 14 of active material on adjacent plates 10. Further, the electrolyte is present in a controlled, limited amount so that substantially all of the electrolyte is absorbed within the interstices of the sheet 18 of fibrous material and any pores in the layers 12 and 14 of active material on the adjacent plates 10.

The separator 18 is useful in controlling gassing in the system. Control of gassing contributes to the unusually high current densities obtained by the improved batteries of the present invention. Gas control is achieved by reducing gassing rate and by allowing gasses which are produced to migrate to areas in which the gasses recombine with liquids or solids in the system. Gas reduction is achieved by producing pure lead, lead dioxide and other electrochemically active materials on the plates 10 as described previously. Further, by controlling the quantity of the electrochemically active materials applied on the plates 10, such that there is an excess of lead or other reducing agent, hydrogen formation is reduced and the gasses produced are oxygen rich.

Experience has shown that oxygen will recombine at the negative electrode more rapidly than hydrogen will recombine at the positive electrode. However, the oxygen must transport from the lead dioxide (where it tends to form) to the lead layers where it will recombine. By adding small quantities of porous polytetrafluoroethylene powder to the porous separator 18, gas paths for oxygen transfer are formed across the separator. Controlling and limiting the amount of electrolyte also enhances the gas transmission through the gas paths formed by the porous polytetrafluoroethylene powder.

Sealing of the spaces containing the separators 18 and electrolyte from the adjacent spaces on facing plates 10 is vital to maximum performance of the battery. If there is any electrolyte path around the edge of a bipolar plate 10, an ionic short circuit will exist around that plate, and the plate will self discharge. In accordance with the present invention, the outer edges of the plates 10 are sealed directly to continuous, circuitous, spacer and sealing rings 20 that surround both the space between the respective layers 12 and 14 of electrochemically active material on the facing sides of adjacent plates 10 and the respective layers 12 and 14. The sealing rings 20 contact the outer peripheral portion of the plates 10 which extend beyond the layers 12 and 14 of electrochemically active material.

The sealing rings 20 are made of a pure thermoplastic polymer similar to the polymer of the plates 10. Preferably, the sealing rings 20 are made of pure polyethylene. When the plates 10, the separators 18 (with associated electrolyte) and the sealing rings 20 are assembled in a stack as shown in the drawing, the stack is heated in an oven at about 200° C. for a time sufficient to soften the polymer at the edges of plate 10 and the periphery of the sealing rings 20, whereby the softened polymers fuse to form a positive liquid tight seal without affecting the layers 12 and 14 of electrochemically active material or the separator 18 and the electrolyte retained therein. Heating times of about 7.5 minutes is sufficient to form a fused seal between the plates 10 and the sealing rings 20.

A top and bottom cover 22 can be provided. The covers are preferably formed of relatively thick sheets of polytetrafluoroethylene. After sealing the seal rings 20 to the plates 10, the battery is essentially complete except for an external casing which is not shown in the drawing. The type and dimensions of the casing will vary according to the needs of the user. The making of appropriate casings is well known in the art and will not be further described herein.

Although preferred embodiments of the improvements in bipolar battery system have been illustrated and described, it is to be understood that the present disclosure is made by way of example and that various other embodiments are possible without departing from the subject matter coming within the scope of the following claims, which subject matter is regarded as the invention.

We claim:

1. An improvement in an electrochemical cell of the type comprising at least two electrically conductive plates which have opposite, broad sides, with said plates disposed side-by-side so that a broad side of one plate is spaced from and faces a respective broad side of an adjacent plate, a layer of electrochemically active material on each of the broad sides of said plates which face a respective broad side of an adjacent plate, with a space occurring between the layers of active material on adjacent plates, and with a liquid electrolyte contained in the space between the layers of active material on adjacent plates so as to establish an electrically conductive path between the layers of active material on the adjacent plates, said improvement comprising forming improved plates from a thermoplastic polymer containing carbon black by dissolving the polymer in a suitable solvent, mixing carbon black with the solvent solution of the polymer, evaporating the solvent from the polymer solution containing the dispersed carbon black, pulverizing the resultant mixture of polymer and carbon black to form a powder, and pressing the powder at an elevated temperature into the improved plates.

2. The improvement in accordance with claims 1, wherein the polymer is polyethylene and it is dissolved in a solvent selected from the group consisting of toluene, xylene and benzene.

3. The improvement in accordance with claim 1 wherein the amount of carbon black in the improved plates is between about 20% to 40% by weight.

4. The improvement in accordance with claim 1, wherein the improved plates have a thickness of between about 0.004 and 0.01 inch.

5. The improvement in accordance with claim 1, further comprising
forming the electrochemically active material on each of the broad sides of the plates by pasting a layer of a reducing agent on respective first sides of the plates and pasting a layer of oxidizing agent on the respective second sides of the plates.

6. The improvement in accordance with claim 1, further comprising
forming the electrochemically active material on each of the broad sides of the plates by pasting a layer of a lead powder on respective first sides of the plates and pasting a layer of lead dioxide on respective second sides of the plates.

7. The improvement in accordance with claim 1, further comprising
forming the electrochemically active material on each of the broad sides of the plates by pasting layers of lead monoxide on both sides of the plates, and then converting the layers on respective first sides of the plates to lead and the layers on respective second sides of the plates to lead dioxide.

8. The improvement in accordance with claim 1, further comprising
forming the electrochemically active material on each of the broad sides of the plates by pasting layers of lead sulfate on both sides of the plates, and then converting the layers on respective first sides of the plates to lead and the layers on respective second sides of the plates to lead dioxide.

9. The improvement in accordance with claim 1, further comprising
forming the electrochemically active material on each of the broad sides of the plates by electroplating layers of lead on both sides of the plates, and then converting the layers on respective first sides of the plates to lead dioxide.

10. The improvement in accordance with claim 1, further comprising
a porous electrolyte absorbing and retaining separator in said space between the layers of active material on adjacent plates, said separator comprising a porous sheet of fibrous material, with porous polytetrafluoroethylene powder being dispersed substantially uniformly through the sheet of fibrous material, and further with said liquid electrolyte being retained in said sheet of fibrous material.

11. The improvement in accordance with claim 10, wherein the fibrous material is selected from the group consisting of glass fibers and cellulose fibers.

12. The improvement in accordance with claim 10, wherein the space between the layers of active material on adjacent plates and the thickness of the sheet of fibrous material is between about 0.0008 and 0.0015 inch, with the sheet of fibrous material being in contact with the layers of active material on adjacent plates.

13. The improvement in accordance with claim 12, wherein the electrolyte is present in a controlled, limited amount so that substantially all of the electrolyte is absorbed within the interstices of the sheet of fibrous material and any pores in the layers of active material on the adjacent plates.

14. The improvement in accordance with claim 1, further comprising
forming the layers of electrochemically active material on the central portions of the broad sides of said plates so that a peripheral edge portion of said plates extend from and surrounds the periphery of the layers of active material; and
positioning continuous, circuitous spacer and sealing rings between adjacent plates, so that the spacer and sealing rings surround both the space between the respective layers of active material on the facing sides of adjacent plates and the respective layers of active material, said spacer and sealing rings further contacting the facing peripheral edges of said adjacent plates which extend beyond the respective layers of active material, said spacer and sealing members being formed from a thermoplastic polymer which is heat sealed to the thermoplastic polymer forming the facing peripheral edges of said adjacent plates.

15. An improvement in an electrochemical cell of the type comprising at least two electrically conductive plates which have opposite, broad sides, with said plates disposed side-by-side so that a broad side of one plate is spaced from and faces a respective broad side of an adjacent plate, a layer of electrochemically active material on each of the broad sides of said plates which face a respective broad side of an adjacent plate, with a space occurring between the layers of active material on adjacent plates, and with a liquid electrolyte contained in the space between the layers of active material on adjacent plates so as to establish an electrically conductive path between the layers of active material on the adjacent plates, said improvement comprising forming improved plates from a thermoplastic polymer containing carbon black dispersed substantially uniformly throughout said polymer;

forming the layers of electrochemically active material on the central portions of the broad sides of said plates so that a peripheral edge portion of said plates extend from and surrounds the periphery of the layers of active material; and positioning continuous, circuitous spacer and sealing rings between adjacent plates, so that the spacer and sealing rings surround both the space between the respective layers of active material on the facing sides of adjacent plates and the respective layers of active material, said spacer and sealing rings further contacting the facing peripheral edges of said adjacent plates which extend beyond the respective layers of active material, said spacer and sealing members being formed from a thermoplastic polymer which is heat sealed to the thermoplastic polymer forming the facing peripheral edges of said adjacent plates.

16. The improvement in accordance with claim 15, wherein the polymer from which both the plates and the spacer and sealing members are formed is polyethylene.

17. A method of making an electrically conductive, thin plate which is useful as a substrate of a bipolar electrode of an electrochemical cell, said method comprising dissolving a thermoplastic polymer in a suitable solvent;

mixing carbon black with the solvent solution of the polymer to substantially uniformly disperse the carbon black in said solution;

evaporating the solvent from the polymer solution containing the dispersed carbon black to form a solid, hardened mixture of polymer and carbon black in which the carbon black is substantially uniformly dispersed in the polymer;

pulverizing the solid mixture of polymer and carbon black to form a powder; and pressing the powder at an elevated temperature into the electrically conductive thin plate.

18. The conductive, thin plate as produced by the process of claim 17.

19. A method in accordance with claim 17, wherein the polymer is polyethylene and it is dissolved in a solvent selected from the group consisting of toluene, xylene and benzene.

20. A method in accordance with claim 17, wherein the thin plates have a thickness of between about 0.004 and 0.01 inch.

21. A method in accordance with claim 17, wherein the amount of carbon black added to the polymer solution is sufficient to yield between about 20% and 40% by weight carbon black in the solid, hardened mixture.

22. A method in accordance with claim 17, wherein the following additional steps are undertaken to convert the thin plate to a bipolar electrode pasting a layer of a first electrochemical active material in the form of a reducing agent to a first side of said thin plate; and pasting a layer of a second electrochemical active material in the form of an oxidizing agent to a second side of said thin plate.

23. A method in accordance with claim 22, wherein the first electrochemical active material is lead powder, and the second electrochemical active material is lead dioxide.

24. A method in accordance with claim 17, wherein the following additional steps are undertaken to convert the thin plate to a bipolar electrode pasting layers of lead monoxide on both sides of said thin plate;

converting the layer on the a first side of said thin plate to lead; and converting the layer on the a second side of said thin plate to lead dioxide.

25. A method in accordance with claim 17, wherein the following additional steps are undertaken to convert the thin plate to a bipolar electrode pasting layers of lead sulfate on both sides of said thin plate;

converting the layer on the a first side of said thin plate to lead; and converting the layer on a second side of said thin plate to lead dioxide.

26. A method in accordance with claim 17, wherein the following additional steps are undertaken to convert the thin plate to a bipolar electrode forming electrochemically active material on each of the broad sides of the said thin plate by electroplating layers of lead on both sides of said plate; and then converting the layer on first side of said thin plate to lead dioxide.

* * * * *

UNITED STATES PATENT AND TRADEMARK OFFICE
CERTIFICATE OF CORRECTION

PATENT NO. : 5,141,828

DATED : Aug. 25, 1992

INVENTOR(S) : Douglas N. Bennion, Rodney M. Lafollette, Lance L. Stewart

It is certified that error appears in the above-identified patent and that said Letters Patent is hereby corrected as shown below:

Immediately after "BACKGROUND OF THE INVENTION" in column 1 add the new paragraph:

--This invention was made with U.S. Government support under contract N00014-85-K-0894 awarded by the Department of the Navy. The U.S. Government has certain rights in the invention.--

Signed and Sealed this

Seventh Day of December, 1993

Attest:

BRUCE LEHMAN

*Attesting Officer*  *Commissioner of Patents and Trademarks*